US011053359B2

(12) United States Patent
Johnson et al.

(10) Patent No.: US 11,053,359 B2
(45) Date of Patent: Jul. 6, 2021

(54) POLYMER COMPOSITIONS WITH PBSA PLASTICIZER

(71) Applicant: Danimer Bioplastics, Inc., Bainbridge, GA (US)

(72) Inventors: Adam Johnson, Bainbridge, GA (US); Rachelle Arnold, Bainbridge, GA (US); Phillip Van Trump, Decatur, GA (US)

(73) Assignee: Danimer Bioplastics, Inc., Bainbridge, GA (US)

( * ) Notice: Subject to any disclaimer, the term of this patent is extended or adjusted under 35 U.S.C. 154(b) by 0 days.

(21) Appl. No.: 16/575,998

(22) Filed: Sep. 19, 2019

(65) Prior Publication Data
US 2020/0010628 A1     Jan. 9, 2020

Related U.S. Application Data

(63) Continuation of application No. 15/795,352, filed on Oct. 27, 2017, now Pat. No. 10,457,782.

(60) Provisional application No. 62/413,479, filed on Oct. 27, 2016.

(51) Int. Cl.
| | | |
|---|---|---|
| *C08J 3/18* | (2006.01) | |
| *C08L 67/02* | (2006.01) | |
| *C08G 63/16* | (2006.01) | |
| *C08G 63/85* | (2006.01) | |
| *C08K 5/00* | (2006.01) | |
| *C08L 27/06* | (2006.01) | |
| *C08L 67/03* | (2006.01) | |
| *C08L 67/04* | (2006.01) | |

(52) U.S. Cl.
CPC ............. *C08J 3/18* (2013.01); *C08G 63/16* (2013.01); *C08G 63/85* (2013.01); *C08K 5/0016* (2013.01); *C08L 27/06* (2013.01); *C08L 67/02* (2013.01); *C08L 67/03* (2013.01); *C08L 67/04* (2013.01); *C08F 2500/01* (2013.01); *C08F 2500/17* (2013.01); *C08L 2205/02* (2013.01)

(58) Field of Classification Search
USPC ........................................ 528/271, 272, 302
See application file for complete search history.

(56) References Cited

U.S. PATENT DOCUMENTS

| | | | |
|---|---|---|---|
| 5,883,199 A | 3/1999 | McCarthy et al. | |
| 6,111,004 A | 8/2000 | Biesiada et al. | |
| 8,519,053 B2 | 8/2013 | Tian et al. | |
| 2002/0052445 A1 | 5/2002 | Terada et al. | |
| 2012/0108743 A1* | 5/2012 | Krishnaswamy | B32B 27/36 524/599 |
| 2015/0203674 A1 | 7/2015 | Weinlein et al. | |
| 2016/0053111 A1 | 2/2016 | Krishnaswamy et al. | |
| 2016/0096917 A1 | 4/2016 | Li et al. | |
| 2016/0108233 A1 | 4/2016 | Kann et al. | |

FOREIGN PATENT DOCUMENTS

| | | |
|---|---|---|
| EP | 2202267 A1 | 6/2010 |
| WO | 0228969 A2 | 4/2002 |
| WO | 2015149029 A1 | 10/2015 |

OTHER PUBLICATIONS

Ahn, B.D., et al., Synthesis and Characterization of the Biodegradable Copolymers from Succinic Acid and Adipic Acid with 1,4-Butanediol, Journal of Applied Polymer Science, col. 82, 2001, pp. 2808-2826.

\* cited by examiner

*Primary Examiner* — Terressa Boykin
(74) *Attorney, Agent, or Firm* — Luedeka Neely Group, P.C.

(57) ABSTRACT

A polymeric composition is disclosed which includes from about 40 to about 99 weight percent of a first polymer and from about 1 to about 60 weight percent of polybutylene (succinate-co-adipate) ("PBSA"). Preferably the first polymer is selected from the group consisting of polyvinyl chloride, polylactic acid, polyhydroxy alkanoates, and mixtures thereof. A method for making the composition is also disclosed.

19 Claims, No Drawings

POLYMER COMPOSITIONS WITH PBSA PLASTICIZER

This application is a continuation of application number 15/795,352, filed Oct. 27, 2017. This application also claims the benefit of the earlier filing date of provisional patent application No. 62/413,479, filed Oct. 27, 2016.

FIELD

This disclosure relates to polymeric compositions. More particularly, this disclosure relates to polymeric compositions incorporating a polybutylene succinate plasticizer.

BACKGROUND

Polyvinyl chloride ("PVC") is a polymer that is commonly used in fields such as construction and commodity packaging. There are two forms of PVC, rigid and flexible. PVC is naturally a rigid polymer, but by adding plasticizer, or combinations of plasticizers, it may advantageously be made more flexible.

Polylactic acid ("PLA") and polyhydroxy alkanoates ("PHAs") are additional polymers which are of increasing commercial importance. Advantageously, PLA and PHAs may be derived from renewable biomass resources, rather than from fossil fuels. Moreover, PLA and PHA products are biodegradable. By themselves, however, PLA and PHAs tend to be a rather rigid and brittle polymer. Consequently, it is also advantageous to modify the properties of the biopolymers with a plasticizer.

Plasticizers for such purposes are typically liquids, having relatively low molecular weights. Typical examples of plasticizers include small molecules such as phthalic acid diesters. Such plasticizers are problematic in certain aspects. First, such plasticizers tend to migrate to the surface of the polymer and bloom, where exposure to the polymer may present a health risk. This blooming tendency is believed to be due, at least in part, to the relatively low molecular weight of the plasticizer. In addition, for applications where flexible PVC is to be recycled, the polymeric material can only be reground 2 or 3 times before the plasticizer is broken down enough to lose its properties.

Consequently, it would desirable if a moderate to high molecular weight material could be used as a plasticizer for PVC, PLA and/or PHAs, which would exhibit little to no migration within the polymeric material. It would also be desirable to provide a flexible PVC which could be recycled multiple times before its desired properties are lost.

SUMMARY OF THE INVENTION

The above and other needs are met by a polymeric composition according to the current disclosure. According to one embodiment, the polymeric composition includes from about 40 to about 99 weight percent of a first polymer; and from about 1 to about 60 weight percent of polybutylene (succinate-co-adipate) ("PBSA").

In certain embodiments of the polymeric composition, the first polymer is preferably selected from the group consisting of polyvinyl chloride, polylactic acid, polyhydroxy alkanoates, and mixtures thereof.

In some embodiments of the polymeric composition, the PBSA preferably has a weight average molecular weight from about 50,000 to about 200,000. More preferably, the PBSA has a weight average molecular weight from about 80,000 to about 120,000. Further, in certain embodiments, the PBSA preferably has a viscosity from about 15,000 to about 40,000 centipoise at a temperature of about 215° C.

In some instances, the PBSA of the polymeric composition preferably has a melting point from about 20° C. to about 75° C. More preferably, the PBSA has a melting point from about 25° C. to about 40° C.

For certain embodiments of the polymeric composition, the PBSA is preferably made up of from about 40 to about 60 mole percent moieties derived from 1,4-butanediol, from about 10 to about 50 mole percent moieties derived from succinic acid, and from about 10 to about 50 mole percent moieties derived from adipic acid.

In certain embodiments of the polymeric composition, the polymeric composition includes from about 1 to about 10 weight percent of the PBSA. More preferably, the polymeric composition includes from about 50 to about 60 weight percent of the PBSA.

In some embodiments of the polymeric composition, the polymeric composition may also include also include at least one additive selected from the group consisting of fillers, pigments, stabilizers, co-stabilizers, secondary plasticizers, lubricants, impact modifiers, and viscosity reducers.

In another aspect, the present disclosure provides a method for making a polymeric composition. In one embodiment, the method includes a first step of reacting 1,4-butanediol with succinic acid and adipic acid to form a pre-polymer. The method also includes a second step of polymerizing the pre-polymer in a condensation polymerization reaction to form polybutylene(succinate-co-adipate) ("PBSA"). This polymeric composition includes from about 40 to about 99 weight percent of the first polymer; and from about 1 to about 60 weight percent of the PBSA.

In certain embodiments of the method, the first polymer is preferably selected from the group consisting of polyvinyl chloride, polylactic acid, polyhydroxy alkanoates, and mixtures thereof.

In some embodiments of the method, the PBSA preferably has a weight average molecular weight from about 50,000 to about 200,000. More preferably, the PBSA has a weight average molecular weight from about 80,000 to about 120,000. Further, in certain embodiments, the PBSA preferably has a viscosity from about 15,000 to about 40,000 centipoise at a temperature of about 215° C.

In some instances, the PBSA used in the method preferably has a melting point from about 20° C. to about 75° C. More preferably, the PBSA has a melting point from about 25° C. to about 40° C.

For certain embodiments of the method, the PBSA is preferably made up of from about 40 to about 60 mole percent moieties derived from 1,4-butanediol, from about 10 to about 50 mole percent moieties derived from succinic acid, and from about 10 to about 50 mole percent moieties derived from adipic acid.

In certain embodiments of the method, the polymeric composition includes from about 1 to about 10 weight percent of the PBSA. More preferably, the polymeric composition includes from about 50 to about 60 weight percent of the PBSA.

In certain embodiments of the method, the polymerization of the pre-polymer to form PBSA is carried out using a metal oxide or an organometal oxide catalyst. The metal in the metal oxide or organometal oxide catalyst is preferably selected from the group consisting of titanium, zirconium, tin, germanium, antimony, hafnium, and bismuth. For instance, the polymerization reaction may be carried out using a catalyst selected from the group consisting of titanium isopropoxide, zirconium butoxide, and mixtures thereof.

DETAILED DESCRIPTION

According to the present disclosure, a polymeric composition is provided. The polymeric composition includes a first polymer and a polybutylene(succinate-co-adipate) ("PBSA") polymer which functions as a plasticizer. Typically, the first polymer will make up from about 40 to about 99 weight percent of the polymer composition and the PBSA will make up from about 1 to about 60 weight percent of the polymeric composition.

While it is believed a variety of materials may be used as the first polymer, the first polymer is preferably selected from the group consisting of polyvinyl chloride ("PVC"), polylactic acid ("PLA"), polyhydroxy alkanoates ("PHAs"), and mixtures thereof.

The term PHAs encompasses a class of biologically derived polymers. From this class of polymers, preferred PHAs for use in accordance with the present disclosure preferably have a first repeat unit having the structure:

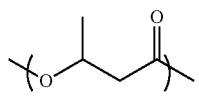

and a second repeat unit having the structure:

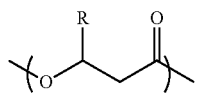

wherein each R is independently a C3 to C19 alkyl group, and wherein the polymer includes from about 75 mole percent to about 99 mole percent of the first repeat unit and from about 1 mole percent to about 25 mole percent of the second repeat unit. A particularly preferred PHA is hydroxybutyrate-hydroxyhexanoate copolymer.

As discussed above, PVC, PLA, and PHA polymers often benefit from the inclusion of a plasticizer additive. Conventional plasticizers, however, may be subject to problems such as blooming or to degradation of the plasticizer if the polymer composition is recycled.

To overcome these difficulties, the present disclosure provides a different plasticizer for use with PVC, PLA, PHAs, and/or other polymers. Specifically, the present disclosure provides a plasticizer which is a polymer made from the condensation polymerization of 1,4-butanediol, succinic acid, and adipic acid. As such, the polymer may be referred to as a polybutylene(succinate-co-adipate) polymer, or PBSA.

As compared to other more conventional plasticizers, the PBSA plasticizers of the present disclosure have average molecular weights which are quite high. For instance, in some embodiments of the polymeric composition, the PBSA may have a weight average molecular weight from about 50,000 to about 200,000. More preferably, the PBSA has a weight average molecular weight from about 80,000 to about 120,000.

In addition to having a high average molecular weight, the PBSA plasticizers of the present disclosure also typically exhibit relatively high viscosity values as well. For instance, the PBSA may preferably have a viscosity from about 15,000 to about 40,000 centipoise when measured at a temperature of about 215° C.

Advantageously, the PBSA plasticizers of the present disclosure have also been found to exhibit less migration and blooming when combined with the first polymer. Without being bound by theory, it is believed that the reduction in migration and blooming may be due the higher molecular weight and/or higher viscosity of the PBSA.

It has also been found that the melting point of the PBSA plasticizer can be adjusted by varying the ratio of succinic acids to adipic acids in the final PBSA polymer. In this regard, the inventors have found that it is generally preferred that the finished PBSA be made up of from about 40 to about 60 mole percent moieties derived from 1,4-butanediol, from about 10 to about 50 mole percent moieties derived from succinic acid, and from about 10 to about 50 mole percent moieties derived from adipic acid.

The resultant PBSA preferably has a melting point from about 20° C. to about 75° C., and more preferably, the PBSA has a melting point from about 25° C. to about 40° C.

As discussed above, the PBSA may in general make up from about 1 to about 60 weight percent of the polymeric composition. The exact of amount may vary depending upon how much relative rigidity or flexibility is desired in the final polymeric composition. For applications in which a more rigid final polymeric composition is desired, the polymeric composition may only include from about 1 to about 10 weight percent of the PBSA plasticizer. In other applications in which a more flexible final polymeric composition is desired, the polymeric composition may include from about 50 to about 60 weight percent of the PBSA plasticizer.

In some instance, the polymeric composition may also include one or more further additives. For instance, the polymeric composition may include one or more additives selected from the group consisting of fillers, pigments, polymer stabilizers, co-stabilizers, secondary plasticizers, lubricants, impact modifiers, and viscosity reducers.

Suitable fillers and pigments include talc, calcium carbonate and titanium dioxide. Examples of suitable polymer stabilizers include tin-based stabilizers, lead-based stabilizers, rare earth metal-based stabilizers, and metal-free stabilizers. Examples of suitable co-stabilizers include antioxidants, epoxy compounds, polyols, perchlorates, and beta-diketones. Examples of suitable secondary plasticizers include phthalate compounds. Examples of suitable lubricants include waxes and either saturated or unsaturated fatty acid metal salts, typically having from about 12 to about 18 carbon atoms per molecule. Examples of suitable viscosity reducers include copolymers containing ethylene moieties and moieties of one or more of the following co-monomers: n-butyl acrylate, carbon monoxide, vinyl acetate, methyl acrylate, and ethyl acrylate. Viscosity reducing copolymers of this type are available from DuPont under the trade name ELVALOY.

Particularly preferred additives which may be included in the polymeric composition may be selected from the group consisting of polybutylene succinate, talc, calcium carbonate, and mixtures thereof.

The PBSA plasticizer may be prepared by first mixing 1,4-butanediol with succinic acid and adipic acid and reacting the mixture to form a pre-polymer. This initial esterification reaction is preferably carried out at a temperature of from about 150 to about 200° C. and for a time period from about 1 to about 24 hours. The reaction is preferably carried out in an esterification reaction equipped with a heat exchanger to re-condense vapors from the reactor. Re-condensed organic components may then be returned to the reactor while re-condensed water may be removed and collected in a separate receiver vessel. Vacuum may also be applied to the esterification reactor.

After the initial pre-polymer is formed, the pre-polymer is further polymerized in a condensation polymerization reaction to form PBSA. This polymerization reaction is preferably catalyzed using a catalyst selected from the group consisting of titanium-containing compounds, zirconium-containing compounds, and mixtures thereof. More preferably, the catalyst is selected from the group consisting of titanium isopropoxide, zirconium butoxide, and mixtures thereof.

The polymerization reaction may be carried out in the same reactor as the initial esterification and is preferably carried out at a temperature of from about 180 to about 275° C. and for a time period from about 1 to about 96 hours in order to provide the final PBSA polymer. Vacuum may also be applied to the reactor during this polymerization.

As noted above, the final PBSA polymer of the present disclosure have average molecular weights which are quite high, typically having a weight average molecular weight from about 50,000 to about 200,000 and more preferably from about 80,000 to about 120,000.

Finally, the completed PBSA polymer is blended with the first polymer and any other desired additive. The mixing is generally carried out using a high shear mixing apparatus such as a Brabender mixer or an extruder and at a temperature in which both the first polymer and the PBSA plasticizer are substantially melted. Typically, the mixing is carried out at a temperature from about 150 to about 225° C.

Advantageously, the PBSA plasticizers of the present disclosure have also been found to exhibit less migration and blooming than conventional plasticizers when combined with polymers such as PVC or PLA. Without being bound by theory, it is believed that the reduction in migration and blooming may be due the higher molecular weight and/or higher viscosity of the PBSA.

Moreover, it has also been found that when the PBSA plasticizers of the present disclosure are blended with PVC, a flexible PVC material is provided which may be recycled and reused multiple times before its desired structural properties are lost. Again without being bound by theory, it is believed that the PBSA plasticizers of the present disclosure exhibit less degradation during recycling as compared to conventional low molecular weight plasticizers, and that this in turn results in an improvement in overall recyclability of the blended polymeric composition.

EXAMPLES

The following non-limiting examples illustrate various additional aspects of the invention. Unless otherwise indicated, temperatures are in degrees Celsius and percentages are by weight based on the dry weight of the formulation.

Example 1

A 5 gallon reactor equipped with a heat exchanger was charged with 1,4-butanediol (21 pounds), succinic acid (11.01 pounds), and adipic acid (20.43 pounds) and heated to 180° C. for 18 hours. During the first 4 hours, the vacuum was ramped down to 300 torr, after which it was gradually reduced to 1 torr. Water was collected in the receiver. When the acid number of the pre-polymer was ≤30, 45 grams of zirconium catalyst was added. The reaction was continued at 205° C. and 1 torr vacuum until the desired viscosity was achieved. Poly(butylene succinate) (2.1 pounds) was added to the reactor and stirred under nitrogen at 205° C. for 2 hours. The product was collected as a slightly translucent, white solid.

Example 2

The process in Example 1 was repeated using titanium isopropoxide as the catalyst.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A polymeric composition comprising:
   from about 40 to about 99 weight percent of a first polymer which comprises polyhydroxy alkanoates; and
   from about 1 to about 60 weight percent of polybutylene (succinate-co-adipate) ("PBSA"), wherein the PBSA comprises:
   from about 40 to about 60 mole percent moieties derived from 1,4-butanediol,
   from about 10 to about 50 mole percent moieties derived from succinic acid, and
   from about 10 to about 50 mole percent moieties derived from adipic acid.

2. The polymeric composition of claim 1, wherein the PBSA has a weight average molecular weight from about 50,000 to about 200,000.

3. The polymeric composition of claim 1, wherein the PBSA has a weight average molecular weight from about 80,000 to about 120,000.

4. The polymeric composition of claim 1, wherein the PBSA has a viscosity from about 15,000 to about 40,000 centipoise at a temperature of about 215° C.

5. The polymeric composition of claim 1, wherein the PBSA has a melting point from about 20° C. to about 75° C.

6. The polymeric composition of claim 1, wherein the PBSA has a melting point from about 25° C. to about 40° C.

7. The polymeric composition of claim 1, wherein the composition comprises from about 1 to about 10 weight percent of the PBSA.

8. The polymeric composition of claim 1, wherein the composition comprises from about 50 to about 60 weight percent of the PBSA.

9. The polymeric composition of claim 1, wherein the composition further comprises at least one additive selected from the group consisting of fillers, pigments, stabilizers, co-stabilizers, secondary plasticizers, lubricants, impact modifiers, and viscosity reducers.

10. A method for making a polymeric composition, comprising the steps of:

reacting 1,4-butanediol with succinic acid and adipic acid to form a pre-polymer;

polymerizing the pre-polymer in a condensation polymerization reaction to form polybutylene(succinate-co-adipate) ("PBSA"); and blending a first polymer which comprises polyhydroxy alkanoates with the PBSA to form a polymeric composition, wherein the polymeric composition comprises from about 40 to about 99 weight percent of the first polymer; and from about 1 to about 60 weight percent of the PBSA, wherein the PBSA comprises:
from about 40 to about 60 mole percent moieties derived from 1,4-butanediol,
from about 10 to about 50 mole percent moieties derived from succinic acid, and
from about 10 to about 50 mole percent moieties derived from adipic acid.

11. The method of claim 10, wherein the PBSA has weight average molecular weight from about 50,000 to about 200,000.

12. The method of claim 10, wherein the PBSA has a weight average molecular weight from about 80,000 to about 120,000.

13. The method of claim 10, wherein the PBSA has a viscosity from about 15,000 to about 40,000 centipoise at a temperature of about 215° C.

14. The method of claim 10, wherein the PBSA has a melting point from about 20° C. to about 75° C.

15. The method of claim 10, wherein the PBSA has a melting point from about 25° C. to about 40° C.

16. The method of claim 10, wherein the composition comprises from about 1 to about 10 weight percent of the PBSA.

17. The method of claim 10, wherein the composition comprises from about 50 to about 60 weight percent of the PBSA.

18. The method of claim 10, wherein the polymerization of the pre-polymer to form PBSA is carried out using a metal oxide or an organometal oxide catalyst, wherein the metal in the metal oxide or organometal oxide catalyst is selected from the group consisting of titanium, zirconium, tin, germanium, antimony, hafnium, and bismuth.

19. The method of claim 10, wherein the polymerization of the pre-polymer to form PBSA is carried out using a catalyst selected from the group consisting of titanium isopropoxide, zirconium butoxide, and mixtures thereof.

* * * * *